(No Model.) 2 Sheets—Sheet 1.
W. W. MARSH & M. E. BLOOD.
GRAIN BINDING HARVESTER.
No. 311,997. Patented Feb. 10, 1885.
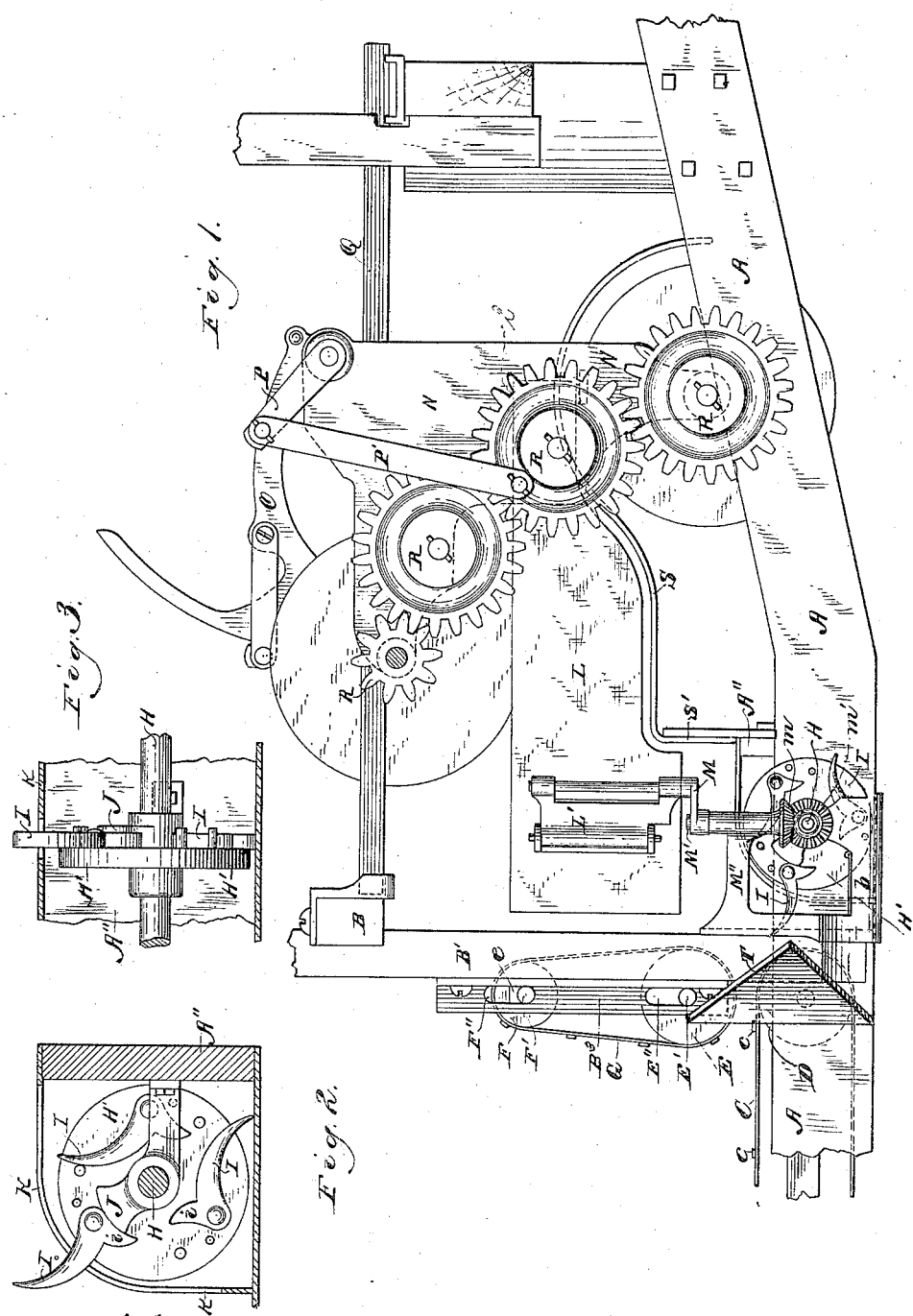
Witnesses.
Inventors
William W Marsh
Maurice E. Blood, (No Model.) 2 Sheets—Sheet 2.
W. W. MARSH & M. E. BLOOD.
GRAIN BINDING HARVESTER.
No. 311,997. Patented Feb. 10, 1885.
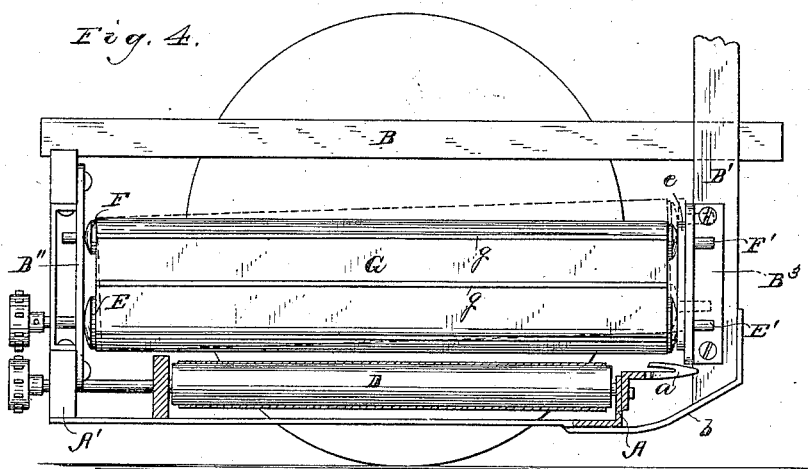
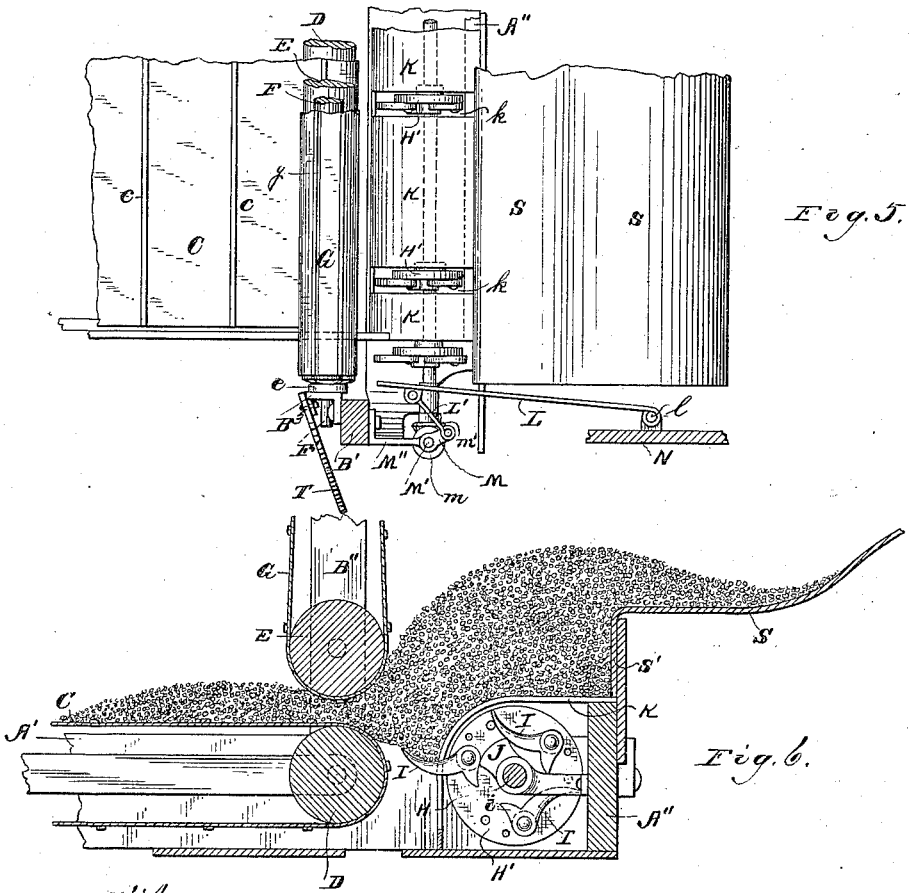
Witnesses.
Inventors
William W Marsh
Maurice E Blood

United States Patent Office.

WILLIAM W. MARSH AND MAURICE E. BLOOD, OF SYCAMORE, ILLINOIS.

GRAIN-BINDING HARVESTER.

SPECIFICATION forming part of Letters Patent No. 311,997, dated February 10, 1885.

Application filed March 11, 1884. (No model.) Patented in England October 9, 1883, No. 4,799.

*To all whom it may concern:*

Be it known that we, WILLIAM W. MARSH and MAURICE E. BLOOD, residing at Sycamore, in the county of De Kalb and State of Illinois, and citizens of the United States, have invented new and useful Improvements in Grain-Binding Harvesters, (for which a patent has been obtained by communication from us, through the Marsh Harvesting Co., by Bernard Samuelson, in Great Britain, No. 4,799, the provisional protection of which was dated October 9, 1883, and the patent sealed December 2, 1883,) of which the following is a full description, reference being had to the accompanying drawings, in which—

Figure 1 is a front or end elevation showing the arrangement and location of the devices that compose this invention, and as much of a harvesting-machine as is deemed necessary to make the description clear and intelligible; Figs. 2 and 3, enlarged details showing a side and front elevation, respectively, of the picker-wheel and picker-cam; Fig. 4, a side elevation, half-size, showing the arrangement of the carrying-rollers and their canvases that take the grain from the receiving-platform and force it to the binder; Fig. 5, a plan or top view of Fig. 4 with the parts broken off at one end, and also the pickers, butting device, and binding-table; Fig. 6, a detail showing the carrier-platform broken off at the grain-wheel end, the vertical or upper canvas, also broken off, the pickers, receiving end of binding-table, and the grain flowing from the carrier-platform to the binding-table.

This invention relates to that class of grain-harvesting machines in which the grain as cut by the sickle falls upon a conveyer belt or apron and is delivered directly from such belt or apron to the binding mechanism to be bound, and the object is to improve and simplify the devices for getting the grain to the binder and have them deliver the grain to the binder in a good and workmanlike manner.

These improvements are fully illustrated in the accompanying drawings and described and pointed out in the specification and claims.

In the drawings, A represents the front sill or finger-beam of a harvesting-machine, having finger-guards $a$ for a sickle to play in. This sill or finger-beam is shown broken off at both ends, but may be made in connection with the frame-work of a harvesting-machine in any suitable manner.

A′ is the rear sill of the grain-platform, and A″ the cross-sill at the delivery end of the platform, connecting the front sill or finger-beam, A, with the rear sill, A′.

B is a beam supported by the reel-post B′ at its forward end, and the post B″, coming up from the rear sill, A′, at its rear end. The reel-post B′ is supported by the casting $b$, coming out from front sill or finger-beam, A.

C is a conveyer, in this case being a belt made of canvas or other suitable material, and having cross-slats $c$ to engage the grain and move it in the usual manner toward the binder.

D is a roller, supported in suitable bearings on the front and rear sills of the platform at the delivery end, over which the belt or apron C passes. This roller is driven from some moving part of the machine to operate the belt or apron C.

E is a roller located over the roller D, both of which rollers are in line, or nearly so, with the inside divider of a harvesting-machine. The roller E is supported in suitable bearings on the reel-post B′ and rear post or standard, B″. This roller has a movement at its lower edge in the same direction that the upper edge of the roller D moves, and it is caused to move or rotate by some moving part of the machine.

F is a roller located above the roller E, and supported in bearings similar to those of roller E. These bearings are made in such a manner as to allow the rollers to pivot in the post or standard B″ at their rear ends, and rise and fall or have vertical movement at their forward ends by means of the slots E″ and F″ in the bearing B³ on the reel-post B′. The roller pins or shafts E′ and F′ revolve and also have play up and down in these slots. The rollers E F are kept the proper distance apart from each other by means of a connecting brace or support, $e$, which has suitable holes near each end, through which the shafts or pins E′ F′ pass, and this brace or support $e$ is made to have the same vertical movement as the rollers E and F.

G is a belt or canvas which passes around the rollers E and F, and is operated by the roller E. It is provided with slats $g$ to act upon the grain, similar to the slats c on belt or apron C. The roller E and belt or canvas G are made to project forward over the finger-beam and sickle for the purpose of taking the grain from that point and keeping the inside divider clear and prevent grain from lodging there, and they are made to come low enough to ride on top of the grain as it flows beneath. They may be held down against the grain by their own gravity, or with a spring, or in any other suitable manner, to cause the parts that act upon the grain to have sufficient friction or carrying powers to force the grain along. At the same time the vertical movement of the belt or canvas G and roller E allows different thicknesses of grain to pass through beneath them.

H is a picker-shaft located at the inner end of the platform, where the grain comes from the conveyer or apron C, and supported in suitable bearings on the front and rear sills of the platform. On this picker-shaft are mounted a series of picker-wheels, H' H' H', each having teeth I I I. The picker-teeth are pivoted to the picker-wheels, so they can be projected to engage the grain and allowed to fold when non-acting. They are projected at the proper time and place to take the grain where it comes from the belt, conveyer-apron C, by means of the cams J, which engage the heels i of the picker-teeth during the rotation of the picker-wheels. The pickers and picker-shaft are caused to rotate by any suitable means from some moving part of the machine.

K is a support for the grain as it comes from the delivery end of the carrier-platform, and also a guard or covering for the picker-shaft and picker-wheels. Its rear and upper edge is fastened to the cross-sill A'', while it curves around over the picker-wheels down between them and the delivery end of the carrier-platform, having its front and lower edge down near by or secured to the bottom of the platform of the machine. There are suitable holes or slotways, k k, made through this support or guard K, for the picker-teeth to project through to act upon the grain.

L is a butting-board, which may be made of wood or other suitable material. It is located to operate upon the grain just after it has passed the inside divider or delivery end of the carrier-platform. It is pivoted at its rear end, l, to a part of the binder-frame or any suitable support, while its free or forward end is allowed to swing horizontally back and forth against the butts of the grain. This swinging or vibrating movement is produced by means of a crank, M, on shaft M', which shaft is supported in bearing M'', coming out from reel-post B', and has on its lower end a bevel-gear, m, which meshes with and is operated by a bevel-gear, m', on the forward end of the picker-shaft H. The motion which is given to the crank M in this manner is communicated to the butt-board L by the connection L' joining the crank to the butt-board.

N is a binder-frame, only a part being shown.
O is the binder-arm or needle.
P is the crank, and P' the pitman or connecting-link for operating the binder-arm.
Q is a brace or support for the binder.
R R R R are a series of gear for operating the binding mechanism, which are not shown, only enough of a binder being shown to show the position, location, and arrangement of the binder relative to the carrier-platform and parts that compose this invention, and any of the usual styles or makes of binders may be used as desired, the binder being located adjacent to the delivery end of the carrier-platform.

S is the binder-table, which lies in a nearly level or horizontal manner, and at a higher elevation than the carrier-platform. This rise or elevation is made in an abrupt and vertical or nearly vertical manner by the rise or wall S', the rise or wall S' resting at its base or lower part on the grain-support or picker-cover K, and rising from there at right angles, or nearly so, with the top line of the carrier-platform, and it supports on its top edge the front part or edge of the binder-table S. This rise or wall S' forms a resistance against the grain as it comes from the carrier-platform, to check the ends of the grain that may be in advance, and hold or retard the same while the lagging ends are being forced up, thus straightening and squaring up the grain before it reaches the binder-table.

T is an inside divider, which may be constructed, arranged, and secured to the machine in any usual and well-known manner.

The operation is as follows: The grain, as cut, falls upon the conveyer belt or apron C, and is carried forward by such belt or apron to the roller D, over which it passes to the grain-support K, and from there over the rise or wall S' to the binder-table S. When the grain arrives at a point over the roller D, it is acted upon by the roller E and belt or canvas G, which operate upon top of the grain in conjunction with the roller D and conveyer or apron C underneath the grain, to receive and draw the grain from the platform and force it toward the binder. The picker-teeth also engage the grain as it comes from the delivery end of the carrier-platform or conveyer C, and assist in carrying and forcing the grain along, and also insure the grain coming away from the conveyer or apron C in the proper manner. When the grain passes over the pickers and grain-support K, it will be held in check from its direct course by the rise or wall S', and when one end of the grain is coming in advance of the other the advance end will be retarded until the lagging end or part behind is forced up by the force of the rollers D and E and their belts or canvases C and G, which operate upon the grain simultaneously, but on opposite sides of the grain, as shown in Fig. 6. The rising and falling movement of the roller E and belt or canvas G allows for inequalities of grain, and regulates the space between the two rollers D and E for the grain to pass through. When the receptacle between the rollers D and E and the rise or wall S' is full, the grain will commence to overflow and roll over or move on to the binder-table, to be acted upon by the binder in any usual manner, while the grain coming from the rollers D and E will be coming into the receptacle in the bottom part along the support K and continuously crowding the upper grain up and over out of such receptacle. While the grain is passing through this receptacle and into the binder, the butts are operated upon and evened up by the butter-board L, which vibrates back and forth, striking those butts which project forward most over the finger-beam and forcing them back even with the rest of the butts.

What we claim as new, and desire to secure by Letters Patent, is—

1. The combination of the roller D, operating the belt C of the platform-carrier and a vertically-running belt, G, located directly over the roller D, both belts having slats to engage the grain, and arranged in such relation to each other that they will press the grain between them for the purpose of securing a firm hold upon the grain to draw it from the platform and push it beyond the delivery end of such platform, and also to keep the inside divider clear, and the belt G made free to yield from the belt C in a vertical line to allow for the passage of different thicknesses of grain between them, substantially as specified.

2. In combination with a carrier-platform and a binder located adjacent to the delivery end of the carrier-platform, two rollers, E and F, located one over the other at the delivery end of the carrier-platform, and having a belt or canvas, G, around them, both the rollers and canvas adapted to rise and fall vertically, substantially as and for the purpose specified.

3. In combination with a carrier-platform, two rollers, E and F, pivoted in a support, B'', at one end, and provided with a support at their opposite ends adapted to allow them to rise and fall and float over the grain, substantially as and for the purposes specified.

4. In combination with a carrier-platform, a rise or wall, S', standing at right angles, or nearly so, with the carrier-platform, and opposite the delivery end of the same, for the purpose of retarding and straightening the grain, and mechanism at the delivery end of the platform to push the grain against the wall S' and over it to a binding-table on the opposite side, substantially as specified.

5. In combination with a carrier-platform and a vertically-running belt or canvas over the delivery end of the carrier-platform, a receptacle for the storage of the grain, located at the delivery end of the carrier-platform, the receptacle having a rising or vertical wall on the side opposite the delivery end of the platform-carrier, substantially as and for the purposes specified.

6. In combination with a carrier-platform, a rise or wall, S', standing at right angles, or nearly so, with the carrier-platform, and opposite the delivery end of the same, and a vertically-running belt or canvas, G, located directly over the delivery end of the carrier-platform, the belt G and the platform-carrier adapted to press the grain between them and push it beyond their delivery ends against and over the wall S' to a binding-table on the opposite side, substantially as and for the purposes specified.

7. The combination of the conveyer or apron C, rollers D and E, belt or canvas G, and rise or wall S', all arranged and operating substantially as and for the purposes specified.

8. The combination of the conveyer or apron C, roller D, picker-teeth I, and rise or wall S', all arranged and operating substantially as and for the purposes specified.

9. The combination of the conveyer or apron C, roller D, picker-teeth I, rise or wall S', and binding-table S, all arranged and operating substantially as and for the purposes specified.

10. The combination of the conveyer or apron C, vertically-running canvas G, inside divider, T, and rise or wall S', all arranged and operating substantially as and for the purposes specified.

11. In combination with a carrier-platform, a binder-table located opposite the delivery end of the carrier-platform, but at a higher elevation than such platform, and a vertical rise or wall, S', for supporting the inner side of the binder-table, and also for resisting the flow of the grain, as a means for straightening the grain before it reaches the binder-table, substantially as specified.

12. The combination of the conveyer or apron C, rollers D and E, belt or canvas G, and the picker-teeth I, and rise or wall S', all arranged and operating as shown and described, substantially as and for the purposes specified.

13. A vibrating butter located to operate against the butts of the grain near the inside divider, in combination with the vertically-running belt or canvas G, located directly behind the inside divider, and the vertical rise or wall S', all arranged substantially as specified.

WILLIAM W. MARSH.
MAURICE E. BLOOD.

Witnesses:
A. M. STARK,
J. L. MILLAR.